D. G. GUNN.
CUSHION TIRE.
APPLICATION FILED OCT. 10, 1916.
1,211,144.
Patented Jan. 2, 1917.
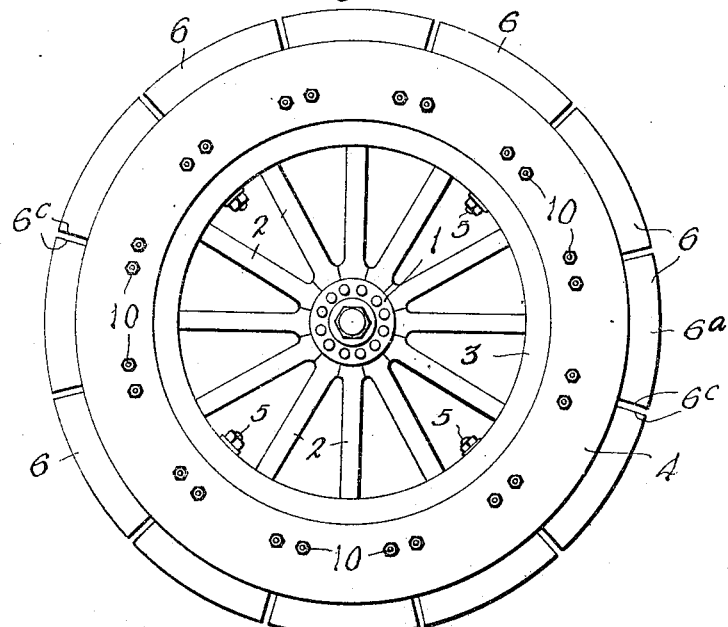
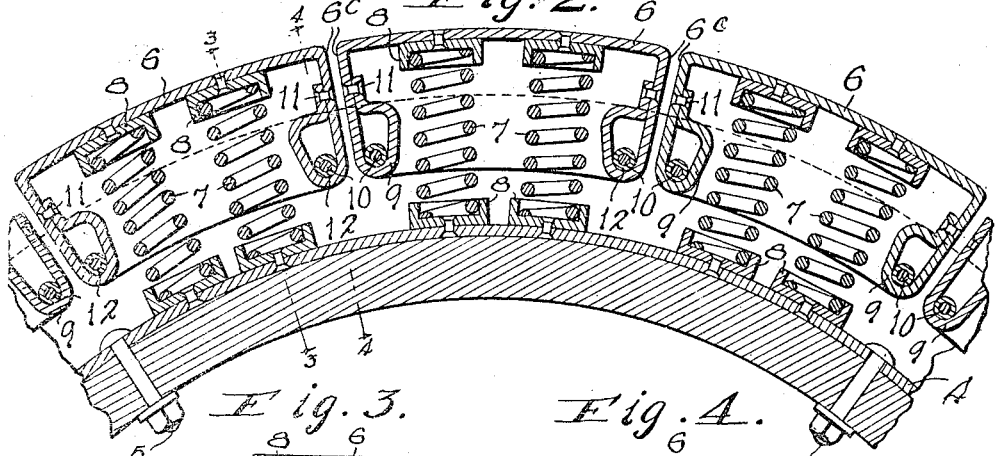
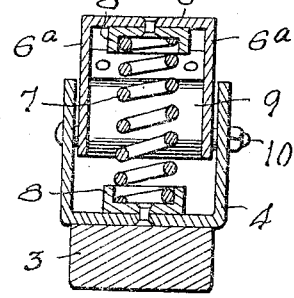
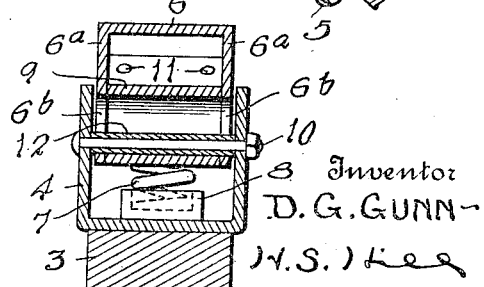
Inventor
D. G. GUNN
H. S. Lee
Attorney

UNITED STATES PATENT OFFICE.

DANIEL G. GUNN, OF WALNUT SPRINGS, TEXAS.

CUSHION-TIRE.

1,211,144.   Specification of Letters Patent.   Patented Jan. 2, 1917.

Application filed October 10, 1916. Serial No. 124,828.

*To all whom it may concern:*

Be it known that I, DANIEL G. GUNN, a citizen of the United States, residing at Walnut Springs, in the county of Bosque, State of Texas, have invented a new and useful Cushion-Tire; and I do hereby declare the following to be a full, clear, and exact description of the invention, such as will enable others skilled in the art to which it appertains to make and use the same.

The present invention relates to certain new and useful improvements in cushion tires for vehicle wheels, and has for its object to provide a device of this character which embodies novel features of construction whereby metallic shoes and springs are utilized to obtain a resilient tread which has the cushioning properties of a pneumatic tire, without the liablity to punctures and blowouts which is always incident to the use of a tire which derives its resiliency from compressed air.

Further objects of the invention are to provide a cushion tire which is comparatively simple and inexpensive in its construction, which can be mounted on any conventional form of wheel, which has great strength and durability, and which possesses sufficient resiliency to effectively absorb the usual shocks and jars and prevent the transmission thereof to the body of the vehicle.

With these and other objects in view the invention consists in certain novel combinations and arrangements of the parts as will more fully appear as the description proceeds, the novel features thereof being pointed out in the appended claims.

For a full understanding of the invention, reference is to be had to the following description and accompanying drawing, in which—

Figure 1 is a side elevation of a wheel provided with a cushion tire, constructed in accordance with the invention. Fig. 2 is an enlarged longitudinal sectional view through a portion of the felly and cushion tire. Fig. 3 is a transverse sectional view on the line 3—3 of Fig. 2. Fig. 4 is a similar view on the line 4—4 of Fig. 2.

Corresponding and like parts are referred to in the following description and indicated in all the views of the drawings by the same reference characters.

For the purpose of illustration, the invention is shown as applied to a conventional form of wheel, the numeral 1 designating the hub thereof, 2 the spokes, and 3 the felly. A channel shaped rim 4 is applied to the felly 3 and rigidly secured in position thereon in some suitable manner, as by means of the bolts 5. A series of independent shoes 6 are assembled within the channel shaped rim 4 with the ends thereof opposed to and normally slightly spaced from each other. The tread portions of the shoes 6 normally project outwardly beyond the channel shaped rim 4, and coil springs 7 are interposed between the shoes and the base of the rim, the extremities of the coil springs being received within cup members 8 which serve to hold the springs in proper position at all times. In the present instance two of the coil springs 7 are arranged within each of the shoes 6, and it will be obvious that the resiliency of these springs will tend to absorb sudden shocks and jars and prevent the same from being transmitted to the vehicle. The sides 6ª of the shoes 6 extend inwardly from the tread portion thereof and telescope within the channel shaped rim 4, being provided with corresponding radial slots 6ᵇ to receive the transverse bolts 10. The ends 6ᶜ of the shoes 6 are brought inwardly and are substantially radially disposed, said ends being preferably provided with integral extensions which are returned inwardly and upwardly to provide loops 9 which register with the before mentioned guide slots 6ᵇ. The extreme ends of the looped extensions may, if desired, be riveted at 11 to the ends 6ᶜ, thereby providing a rigid construction. The ends of adjacent shoes 6 are normally slightly spaced from each other so that the various shoes can be readily forced inwardly by engagement with the surface of the road without binding against each other. The bolts 10 which connect the side flanges of the channel shaped rim 4 are loose within the loops 9 and slots 6ᵇ and serve to direct the shoes in their in and out movements, although the slots and loops are sufficiently large in size to provide the necessary clearance space for the bolts as the shoes are forced inwardly. Antifriction rollers 12 may be placed upon the bolts 10 to insure a perfect freedom of action when the shoes are moved inwardly.

As the wheel rotates and the various shoes 6 are brought successively into engagement with the road surface, the said shoes will be forced inwardly against the action of the springs 7, the resiliency of the said springs serving to absorb the shocks and jars and prevent the same from being transmitted to the body of the vehicle. The sides 6ª of the shoes slidably engage the side flanges of the channel shaped rim 4 and telescope freely in and out therein, while sufficient clearance space is provided at the ends of the shoes to prevent the shoes from binding upon each other and preventing proper action thereof. These shoes can be formed of comparatively heavy metal so that they will wear practically indefinitely, and there will be little need of repair, since there are no rubber parts, and the tire is not dependent for its resilient qualities upon confined air.

Having thus described the invention, what I claim as new and desire to secure by Letters Patent, is:—

1. In a device of the character described, the combination with a channel shaped rim, of a series of independent hollow shoes formed of sheet metal and loosely assembled within the rim, said shoes having side flanges which slidably engage the sides of the rim and being also formed with end flanges terminating in extensions which are looped inwardly, the side flanges being provided with slots which register with the said looped extensions, transverse bolts connecting the flanges of the rim and passing loosely through the slots and looped end extensions, and springs interposed between the shoes and the base of the channel shaped rim.

2. In a device of the character described, the combination with a channel shaped rim, of a series of independent hollow shoes formed of sheet metal and loosely assembled within the rim, said shoes having side flanges which slidably engage the sides of the rim and being also formed with square ends which are normally slightly spaced from each other, the ends terminating in extensions which are looped inwardly and the sides being formed with slots which register with the said looped extensions, transverse bolts connecting the flanges of the rim and loosely received within the looped end extensions and side slots, and springs interposed between the shoes and the base of the channel shaped rim.

In testimony whereof I have signed my name to this specification in the presence of two subscribing witnesses.

DANIEL G. GUNN.

Witnesses:
L. R. WHITELEY,
T. E. ROBBINS.

Copies of this patent may be obtained for five cents each, by addressing the "Commissioner of Patents, Washington, D. C."